US012774765B2

(12) United States Patent
Beagen, Jr.

(10) Patent No.: US 12,774,765 B2
(45) Date of Patent: Oct. 27, 2026

(54) PIPE COUPLING

(71) Applicant: ASC Engineered Solutions, LLC, Portsmouth, NH (US)

(72) Inventor: Joseph William Beagen, Jr., North Attleboro, MA (US)

(73) Assignee: ASC ENGINEERED SOLUTIONS, LLC, Oak Brook, IL (US)

( * ) Notice: Subject to any disclaimer, the term of this patent is extended or adjusted under 35 U.S.C. 154(b) by 178 days.

(21) Appl. No.: 18/220,588

(22) Filed: Jul. 11, 2023

(65) Prior Publication Data

US 2023/0358350 A1 Nov. 9, 2023

Related U.S. Application Data

(60) Continuation of application No. 17/750,014, filed on May 20, 2022, now Pat. No. 11,739,869, which is a continuation of application No. 16/796,766, filed on Feb. 20, 2020, now Pat. No. 11,365,835, which is a division of application No. 15/359,676, filed on Nov. 23, 2016, now Pat. No. 10,641,421, which is a continuation of application No. 13/354,466, filed on Jan. 20, 2012, now Pat. No. 9,534,715.

(51) Int. Cl.

| | |
|---|---|
| ***F16L 17/04*** | (2006.01) |
| ***F16J 15/02*** | (2006.01) |
| ***F16L 17/025*** | (2006.01) |
| ***F16L 21/02*** | (2006.01) |
| ***F16L 21/06*** | (2006.01) |
| *F16L 17/03* | (2006.01) |

(52) U.S. Cl.
CPC ........... *F16L 21/065* (2013.01); *F16J 15/025* (2013.01); *F16L 17/025* (2013.01); *F16L 17/04* (2013.01); *F16L 21/02* (2013.01); *F16J 15/022* (2013.01); *F16L 17/03* (2013.01)

(58) Field of Classification Search
CPC ....... F16L 55/172; F16L 21/065; F16L 17/04; F16L 17/025; F16L 21/02; F16L 17/03; F16J 15/025; F16J 15/022
See application file for complete search history.

(56) References Cited

U.S. PATENT DOCUMENTS

| | | | | |
|---|---|---|---|---|
| 1,876,638 A | | 9/1932 | Dillon | |
| 5,058,931 A | * | 10/1991 | Bowsher ................ | F16L 17/04 285/112 |
| 8,282,136 B2 | * | 10/2012 | Vandal .................... | F16L 21/06 285/112 |
| 9,528,642 B2 | * | 12/2016 | Bancroft ............... | F16L 21/065 |
| 9,903,515 B2 | | 2/2018 | Bancroft et al. | |

(Continued)

*Primary Examiner* — Matthew Troutman
*Assistant Examiner* — James A Linford
(74) *Attorney, Agent, or Firm* — McAndrews Held & Malloy, Ltd.

(57) ABSTRACT

A coupling sized for use with a pipe having a pipe outer diameter, the coupling including a pair of segments; and a gasket positioned between the pair of segments, the gasket including an annular body; and a pair of sealing ribs each extending substantially radially inwardly from the annular body, each sealing rib of the pair of sealing ribs defining a cylindrical sealing surface at an innermost radial extent in an uncompressed state, the cylindrical sealing surfaces each defining an inner gasket diameter that is larger than the pipe outer diameter when the gasket is in the uncompressed state.

19 Claims, 12 Drawing Sheets

(56) References Cited

U.S. PATENT DOCUMENTS

| | | | |
|---|---|---|---|
| 10,408,368 | B2 | 9/2019 | Bancroft et al. |
| 10,641,419 | B2 | 5/2020 | Ohnemus |
| 11,181,213 | B2 | 11/2021 | Ohnemus et al. |
| 11,378,208 | B2 | 7/2022 | Ohnemus et al. |
| 11,739,869 | B2 | 8/2023 | Beagen, Jr. |
| 2018/0023735 | A1 | 1/2018 | Bancroft et al. |
| 2018/0163905 | A1 | 6/2018 | Ohnemus et al. |
| 2018/0163906 | A1 | 6/2018 | Ohnemus et al. |
| 2018/0187805 | A1 | 7/2018 | Bancroft et al. |
| 2019/0032823 | A1 | 1/2019 | Mcnamara et al. |
| 2019/0032825 | A1 | 1/2019 | Mcnamara et al. |
| 2020/0032934 | A1 | 1/2020 | Belen et al. |
| 2022/0074527 | A1 | 3/2022 | Mcnamara et al. |
| 2022/0282809 | A1 | 9/2022 | Beagen, Jr. |

* cited by examiner

PIPE COUPLING

REFERENCE TO RELATED APPLICATIONS

This application is a continuation of U.S. application Ser. No. 17/750,014, filed May 20, 2022, which is a continuation of U.S. application Ser. No. 16/796,766, filed Feb. 20, 2020, which issued into U.S. Pat. No. 11,365,835 on Jun. 21, 2023, which is a divisional of U.S. application Ser. No. 15/359,676, filed Nov. 23, 2016, which issued into U.S. Pat. No. 10,641,421 on May 5, 2020, which is a continuation of U.S. application Ser. No. 13/354,466, filed Jan. 20, 2012, which issued into U.S. Pat. No. 9,534,715 on Jan. 3, 2017, each of which is hereby specifically incorporated by reference herein in its entirety.

FIELD

This disclosure relates to piping. More specifically, this disclosure relates to pipe coupling.

BACKGROUND

Pipe elements such as pipes, valves, and meters typically are not made of one piece. Rather, such pipe elements are formed in finite lengths and must be joined. One way of joining such pipe elements is through the use of a coupling member. A sealing gasket is typically disposed in a central space of at least one coupling segment which is thereafter tightened around the pipe elements to be joined.

SUMMARY

Disclosed is a coupling sized for use with a pipe having a pipe outer diameter, the coupling comprising: a pair of segments; and a gasket positioned between the pair of segments, the gasket comprising: an annular body; and a pair of sealing ribs each extending substantially radially inwardly from the annular body, each sealing rib of the pair of sealing ribs defining a cylindrical sealing surface at an innermost radial extent in an uncompressed state, the cylindrical sealing surfaces each defining an inner gasket diameter that is larger than the pipe outer diameter when the gasket is in the uncompressed state.

Also disclosed is a gasket sized for use with a pipe having a pipe outer diameter, the gasket comprising: an annular body; and a pair of sealing ribs each extending substantially radially inwardly from the annular body, each sealing rib of the pair of sealing ribs defining a cylindrical sealing surface at an innermost radial extent in an uncompressed state, the cylindrical sealing surfaces defining an inner gasket diameter that is larger than the pipe outer diameter when the gasket is in the uncompressed state.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DESCRIPTION OF THE FIGURES

The features and components of the following figures are illustrated to emphasize the general principles of the present disclosure and are not necessarily drawn to scale. Corresponding features and components throughout the figures may be designated by matching reference characters for the sake of consistency and clarity.

DETAILED DESCRIPTION

Disclosed is a pipe coupling and associated methods, systems, devices, and various apparatus.

The pipe coupling includes at least one segment, at least one tightening element, and at least one gasket. The pipe coupling is adapted to seal pipe elements in end-to-end relationship. It would be understood by one of skill in the art that the disclosed pipe coupling is described in but a few exemplary embodiments among many. No particular terminology or description should be considered limiting on the disclosure or the scope of any claims issuing therefrom.

Figure 1:
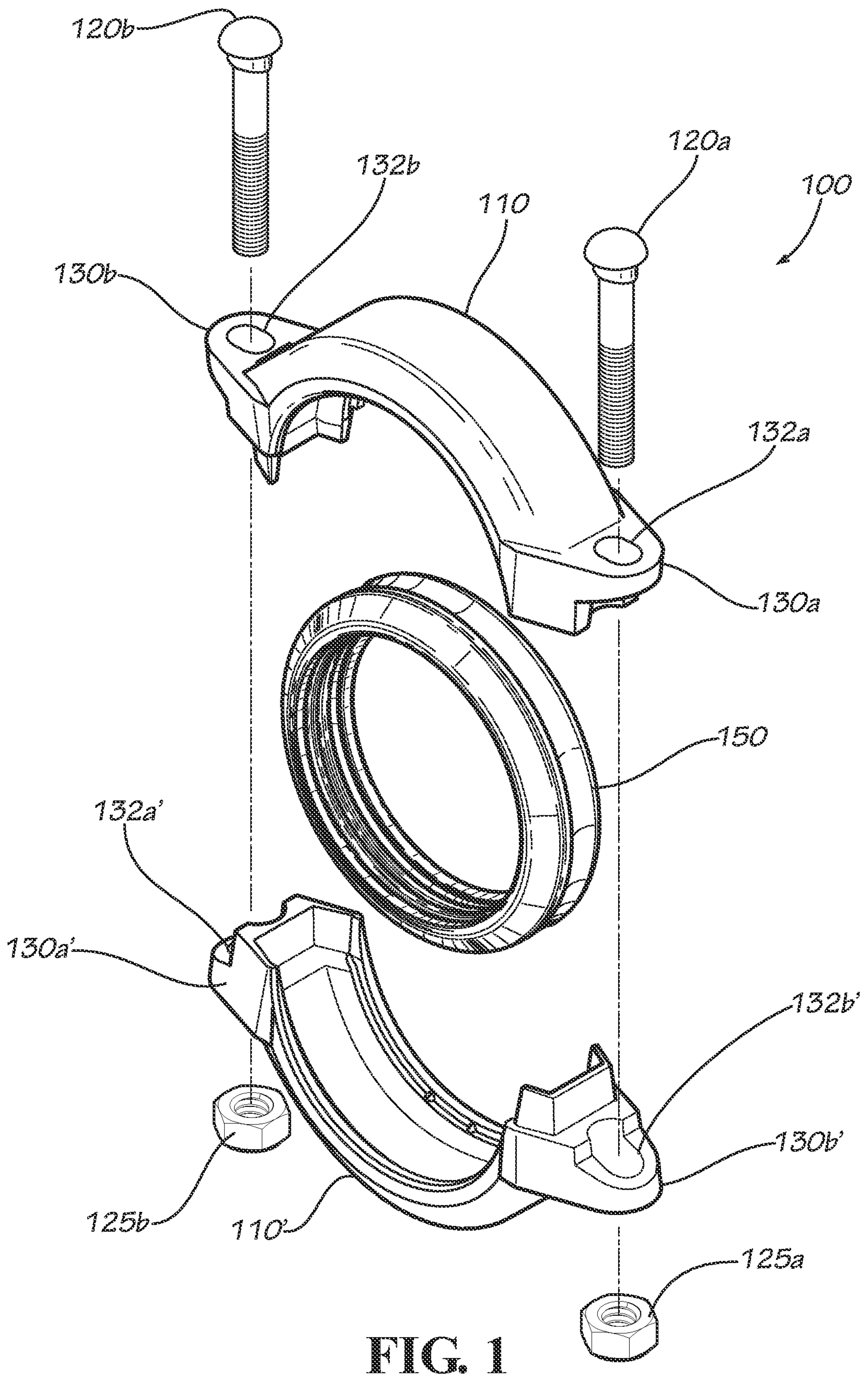
FIG. 1 is an exploded perspective view of a coupling in accord with one embodiment of the current disclosure.

One embodiment of a pipe coupling 100 is disclosed and described in FIG. 1. The pipe coupling 100 of the current embodiment includes two segments 110,110' although any number of segments 110 may be used in various embodiments. The current embodiment includes tightening elements or fasteners that are nut and bolt fasteners. Two bolts 120*a,b* are disposed to interact with nuts 125*a,b* in threaded engagement. Various types of tightening elements may be used in various embodiments, and the disclosure of bolts 120*a,b*, and nuts 125*a,b* should not be considered limiting. Fastener pads 130*a,b* protrude from segment 110 and fastener pads 130*a*',b' protrude from segment 110'. Fastener holes 132*a,b,a*',b' are defined in fastener pads 130*a,b,a*',b', respectively. In the current embodiment, the fastener holes 132*a,b,a*',b' are about centered within the fastener pads 130*a,b,a*',b', although they may be offset in various embodiments. Although the fastener pads 130*a,b,a',b*' and fastener holes 132*a,b,a*',b' are described in the current configuration, various locations and configurations of fastener pads 130*a, b,a*',b' and fastener holes 132*a,b,a*',b' are included in various embodiments. A gasket 150 is included with the pipe coupling 100. The gasket 150 of the current embodiment is annular and adapted to surround and to seal fluid piping, although various configurations will be included in various embodiments.

Figure 2:
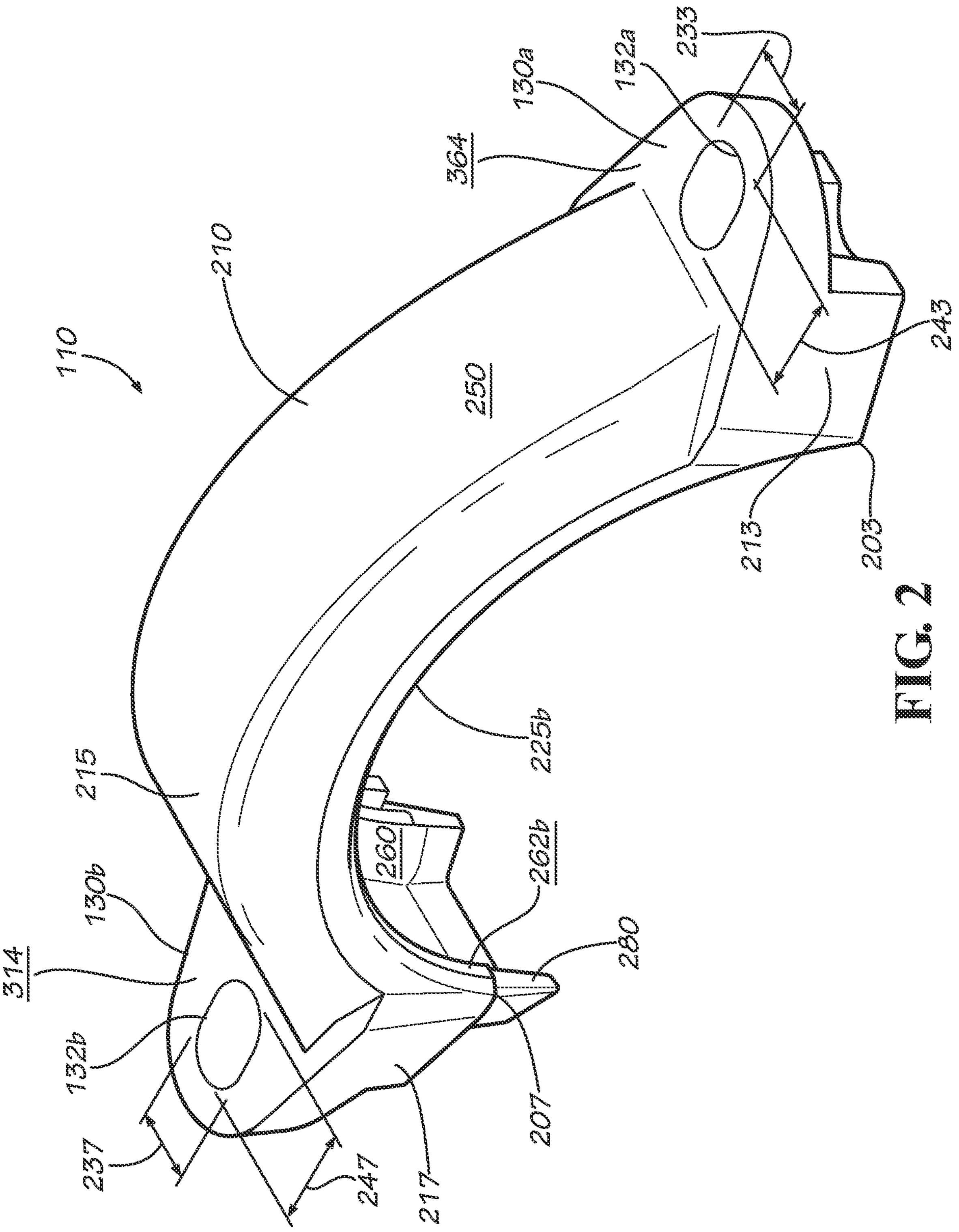
FIG. 2 is an outer perspective view of a segment of the coupling of FIG. 1.
Figure 3:
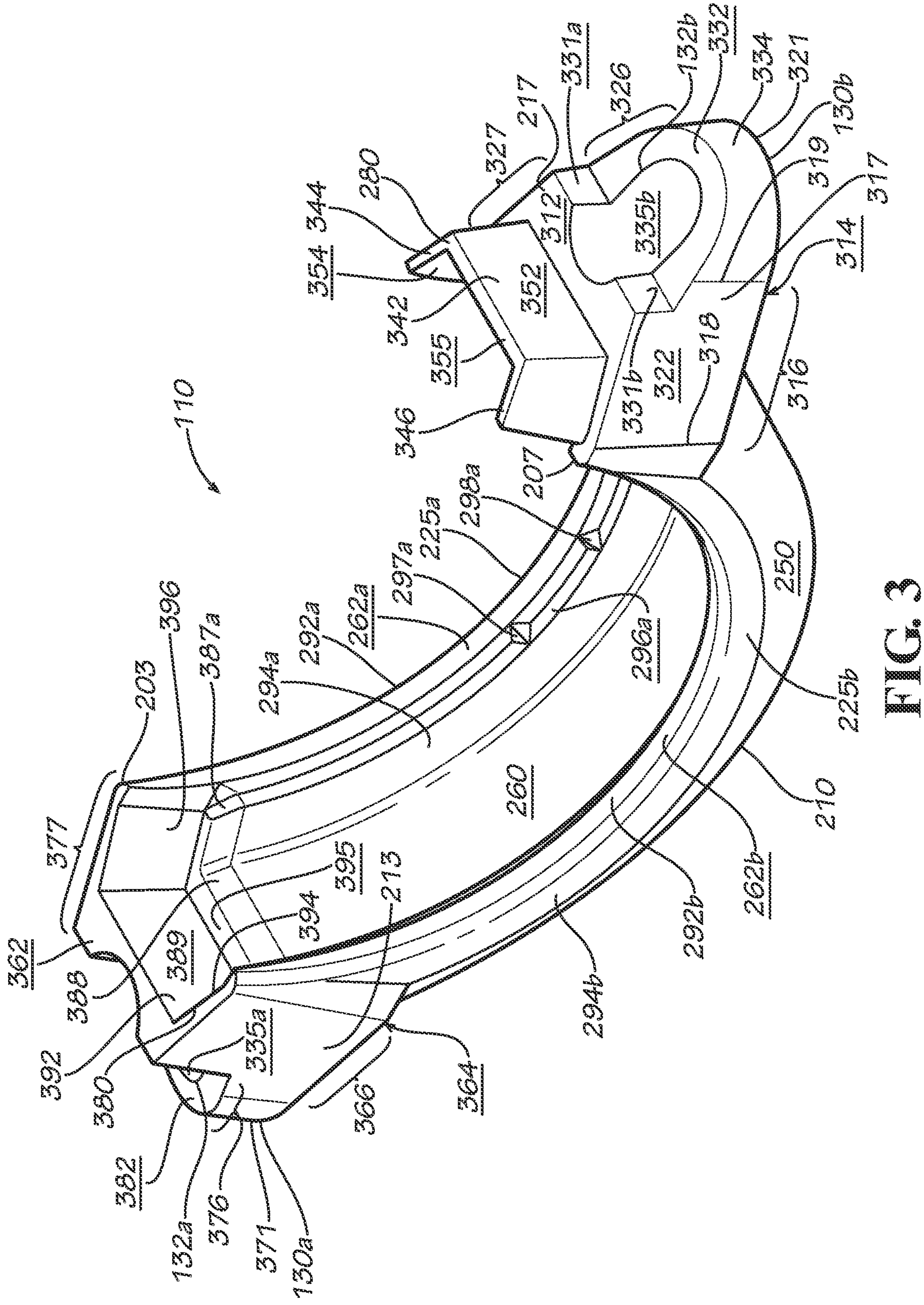
FIG. 3 is an inner perspective view of the segment of FIG. 2.
Figure 4:
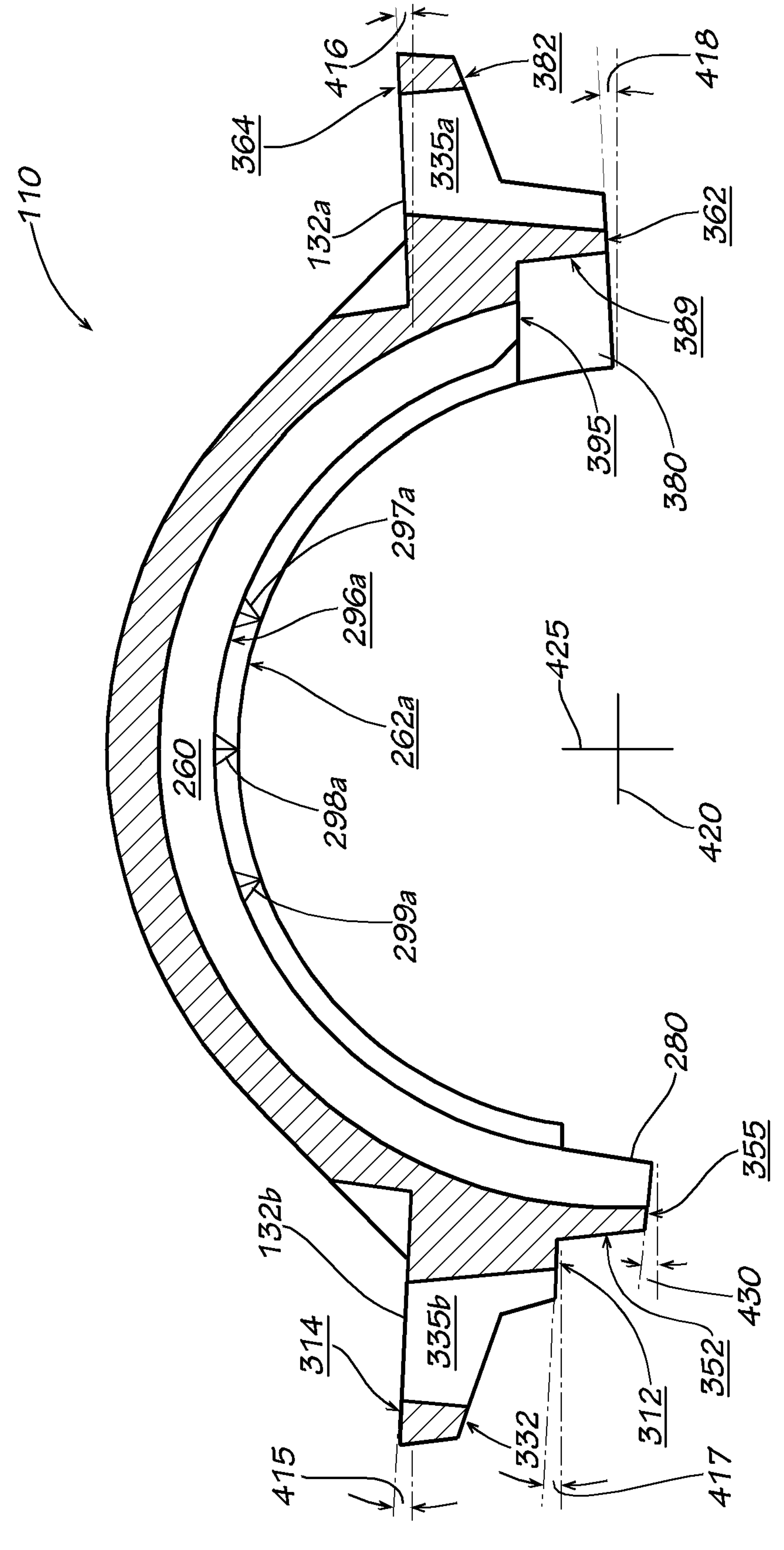
FIG. 4 is a cross-sectional view of the segment of FIG. 2.

FIGS. 2, 3, and 4 show segment 110. In the current embodiment, segment 110' is substantially identical to segment 110. As seen in FIG. 2, each segment 110 includes two ends 203,207 and a segment body 210 disposed between the two ends 203,207. Each segment 110 in the current embodiment is about semicircular, although other configurations may be used in various embodiments. Proximate each end 203,207 is a shoulder 213,217 protruding outwardly from the segment 110. Each shoulder 213,217 provides a connection point for a fastener which, in the current embodiment, is a bolt 120. Each shoulder 213,217 includes fastener holes 132*a,b* defined in fastener pads 130*a,b*.

Each segment body 210 includes a central portion 215 and at least one edge portion 225*b* (225*a* not shown in FIG. 2). In the current embodiment, the edge portions 225*a,b* are designed to interact with a groove in the pipe elements to be sealed and joined, although some embodiments may be designed to interact with non-grooved pipe elements.

As can be seen in FIG. 2, each fastener hole 132*a,b* includes a first linear extent or an axial length 233,237 and a second linear extent or transverse length 243,247. The axial lengths 233,237 and the transverse lengths 243,247 are measured at top surfaces 364,314 of the fastener pads 130*a,b*. These dimensions increase through the fastener pads 130*a,b* in the current embodiment because they are cast, and a draft angle is used in casting. In various embodiments, these dimensions may remain constant if, for example, the fastener holes 132*a,b* are made via a machining step. In the current embodiment, each fastener hole 132*a,b* is about ovular in shape, although other embodiments may include various shapes. The shape of the current embodiment of the fastener holes 132*a,b* provides interference with the bolts 120*a,b* to reduce rocking motion, as will be described later with reference to FIG. 9. Each segment 110 includes an outer surface 250 and an inner surface 260. A contact surface 262*b* (262*a* shown in FIG. 3) is included on the inside of each edge portion 225*a,b*. Also seen in FIG. 2 is a tongue 280, as will be described in more detail with reference to FIGS. 3, 4, and 6.

As seen more clearly in FIG. 3, the tongue 280 protrudes from the end 207 of the segment 110. The shoulder 217 can be seen protruding outwardly from the segment 110. In the current embodiment, the shoulder 217 includes a bottom surface 312 and a top surface 314. The bottom surface 312 and the top surface 314 are substantially parallel in the current embodiment and are angled in order to ensure proper alignment upon deformable tightening of the pipe coupling 100, as will be discussed later with reference to FIG. 4. However, in some embodiments, the bottom surface 312 and the top surface 314 are not angled. A wall 317 of the shoulder 217 is seen along the outside of the shoulder 217. The wall 317 in the current embodiment defines a draft portion 316 having a draft angle such that the thickness of the shoulder 217 at a beginning of the draft 318 is thicker than the thickness at an end of the draft 319. The angle of the draft portion 316 is consistent between the beginning of the draft 318 and the end of the draft 319 so that the region defining the draft angle is a linear taper in the current embodiment, although other shapes may be used in various embodiments. A radiused portion 321 extends beyond the draft portion 316 to provide an end 334 of the shoulder 217 beyond the fastener hole 132*b*. The wall 317 includes an outer surface 322.

As can be seen from the view of FIG. 3, the shoulder 217 includes a taper portion 326. The taper portion 326 terminates at the end 334 of the shoulder 217 and melds at the other end with a parallel portion 327 of the shoulder 217. As previously described, the bottom surface 312 is parallel to the top surface 314 in the parallel portion 327. A ledge surface 331*a,b* provides a quick transition to the taper portion 326, which includes a taper bottom surface 332 that is not parallel to the top surface 314. An inner surface 335*b* of the fastener hole 132*b* can also be seen in the current view.

The tongue 280 includes three portions in the current embodiment: a central portion 342, a first side portion 344, and a second side portion 346. The side portions 344,346 are oriented with respect to the central portion 342 such that an angle is formed between each. In the current embodiment, the angle is greater than ninety degrees. The tongue 280 includes an outer surface 352, an inner surface 354, and a mating surface 355. The mating surface 355 is angled at a tip angle 430, which is shown in FIG. 4. The mating surface 355 is located on a leading edge of the tongue 280.

Shown along the other end 203 is the other shoulder 213. The shoulder includes a bottom surface 362 and a top surface 364 that are substantially parallel. The shoulder 213 includes a draft portion 366 and a radiused portion 371. A taper portion 376 is included just like with shoulder 213. A parallel portion 377 is also included where the bottom surface 362 is parallel to the top surface 364 in the region. Ledge surfaces 381*a,b* (not shown) are also included just like ledge surfaces 331*a,b*, and a taper bottom surface 382 is also included.

A groove 380 is defined in the shoulder 213. The groove 380 is sized to accept the tongue 280. The groove 380 includes a central wall 392 and two side walls 394,396. The groove 380 is further defined by a mating surface 395. In assembly, the mating surface 395 contacts the mating surface 355' of another segment 110'. A groove shoulder surface 389 is included on the inside of the groove 380. A draft portion 388 can be seen proximate the end of the segment 110 nearest the groove 380. The draft portion 388 provides a relief from the inner surface 260 to the mating surface 395 to line up with the tongue 280', which is slightly set back from the inner surface 260'. The draft portion 388 helps prevent the coupling 100 from pinching the gasket 150 during installation, as pinching of the gasket 150 can lead to failure of the gasket 150 including slicing and rupture of the gasket 150. A draft portion shoulder surface 387*a,b* (387*b* not shown) provides the part of the step-down from a shoulder surface 296*a,b* (296*b* not shown) to the mating surface 395.

Each edge portion 225*a,b* of the segment 110 includes a contacting portion 292*a,b* and a support portion 294*a,b*. The contact surface 262*a,b* is included at the end of the contacting portion 292*a,b*. The shoulder surface 296*a* (296*b* not shown) can be seen at the inside end of the support portion 294*a* (inside end of the support portion 294*b* not shown). Three nodes 297*a*,298*a* (299*a,b* and 297*b*,298*b* not shown) protrude from the shoulder surface 296*a,b* between the support portion 294*a,b* and the contacting portion 292*a,b*. Each node 297*a,b* and 298*a,b* include a width that decreases from the support portion 294*a,b* to the contacting portion 292*a,b*. Although the nodes 297*a,b*, 298*a,b*, and 299*a,b* are pyramidal in the current embodiment, they may be various shapes in various embodiments.

The gasket 150 is designed to interact with the inner surface 260 of each segment 110 in the pipe coupling 100, as will be discussed with reference to FIG. 5.

As seen in the cross-sectional view of FIG. 4, the top surfaces 314,364 and the bottom surfaces 312,362 are aligned at angles 415,416,417,418 with respect to a horizontal axis 420 of the segment 110. A vertical axis 425 is shown for reference. The angles 415,416,417,418 allow for deflection of the segment 110 in use. In some embodiments, the angles 415,416,417,418 will be zero such that the top surfaces 314,364 are aligned with the horizontal axis 420 when no deflection is present. The tip angle 430 of the tongue 280 can be seen such that the mating surface 355 is aligned angularly with respect to the horizontal axis 420. The tip angle 430 is greater than the other angles 415,416, 417,418 in the current embodiment, although other configurations may be found in various embodiments. When the segment 110 is deflected, the mating surface 355 contacts the mating surface 395 of another segment 110. In various embodiments, the tip angle 430 is approximately the same as the angles 415,417 of the top surface 314 and bottom surface 312, respectively.

Also seen in cross-sectional view, each fastener hole 132*a,b* is drafted such that each fastener hole 132*a,b* defines a cone-shaped void that is approximately ovular in cross-section, although various cross-sectional shapes may be found in various embodiments. As such, each fastener hole 132*a,b* includes a smaller aperture at the top surface 314,364 than where the fastener hole 132*a,b* emerges into the taper bottom surface 332,382 and the bottom surface 312,362. This configuration may be omitted in various embodiments.

Figure 5:
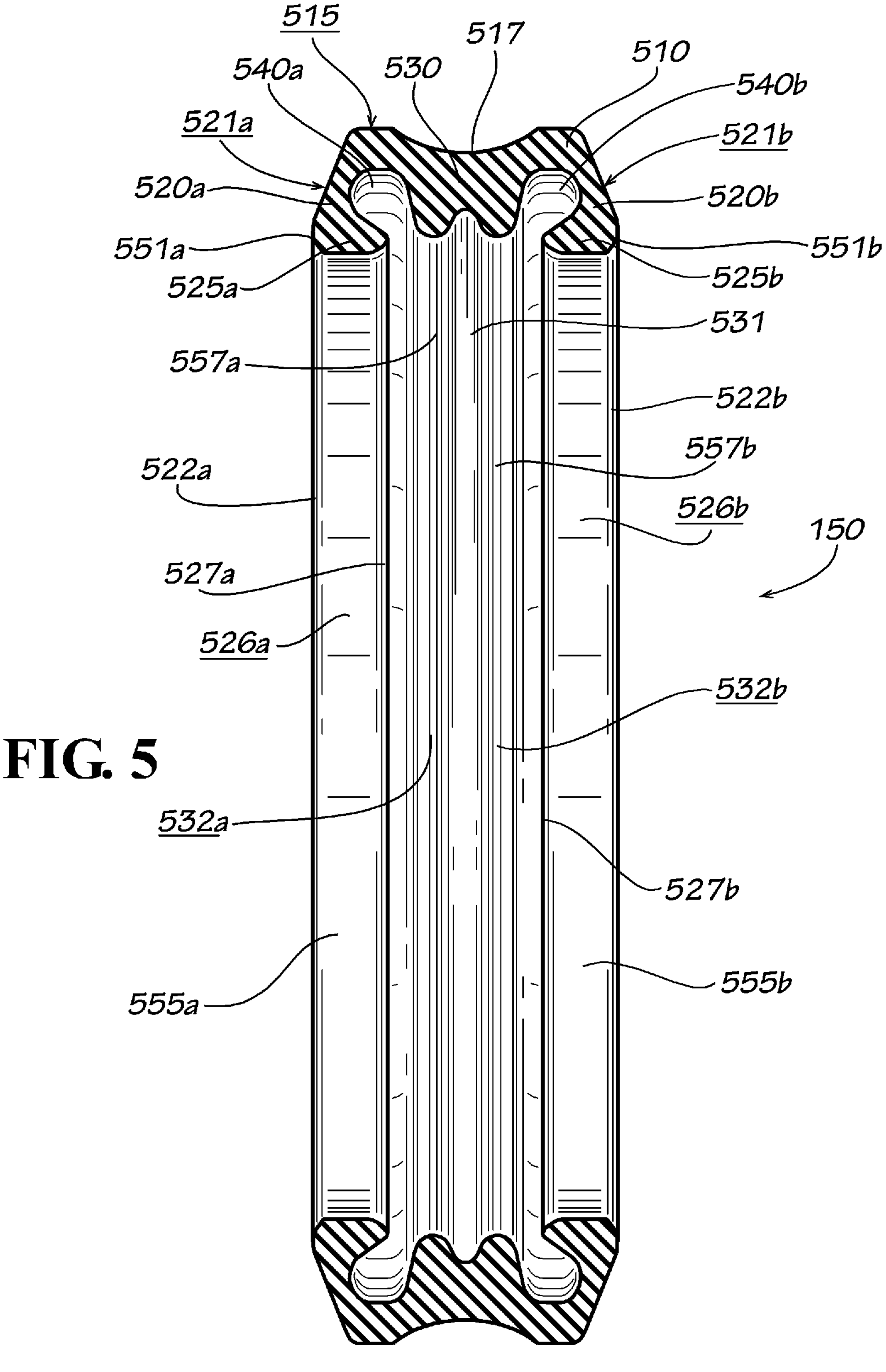
FIG. 5 is a cross-sectional view of a gasket of the coupling of FIG. 1.

As can be seen in FIG. 5, the gasket 150 is ring-shaped and includes an annular body 510 having a radially outer surface 515. The radially outer surface 515 interacts with the inner surface 260 of each segment 110 in the pipe coupling 100. The radially outer surface 515 of the annular body 510 includes a deformation groove 517. The annular body 510 includes side portions proximate axial ends of the annular body 510. Extending substantially radially inward from the side portions of the annular body 510 are a pair of sealing ribs 520*a,b*. Each sealing rib 520*a,b* extends substantially radially inwardly and increases in thickness from radially outside to radially inside. Each sealing rib 520*a,b* also has an axially outer surface 521*a,b* extending from the radially outer surface 515 to the start of an axially outer drafted edge 522*a,b*. Each axially outer surface 521*a,b* is angled with respect to a radial direction. The angle of each axially outer surface 521*a,b* is consistent around the entirety of the annular body 510, so that axially outer surfaces 521*a,b* are shaped as a truncated cone. In the current embodiment, each axially outer surface 521,*a,b* is angled between nineteen and twenty-two degrees with respect to a radius of the gasket 150, although other configurations may be present in various embodiments.

Each sealing rib 520*a,b* has a sealing ridge 525*a,b* extending axially inward from a radially inward end 551*a,b* of each sealing rib 520*a,b*. Each sealing ridge 525*a,b* extends substantially axially inward from the radially inward end 551*a,b* of each sealing rib 520*a,b*, such that the two sealing ridges 525*a,b* extend toward each other. The axially outer drafted edges 522*a,b* extend from the radially inward end 551*a,b* to a contact portion 555*a,b*. Each axially outer drafted edge 522*a,b* may be rounded, slanted, or various shapes in cross-section in various embodiments. Such cross-sectional shapes translate to conical and paraboloid shapes in various embodiments. Such shapes are truncated, as a full cone or paraboloid would not allow insertion of pipe elements in the gasket 150. In the embodiment shown in FIG. 5, the axially outer drafted edges 522*a,b* are slanted at an angle approximately between 27° and 28° from a radial direction, although various other angles may be present in various embodiments. Contact portions 555*a,b* extend along the sealing ridges 525*a,b* from the axially outer drafted edges 522*a,b* to an axially inner drafted edge 527*a,b*. Each contact portion 555*a,b* includes a sealing surface 526*a,b* facing radially inward and coplanar or collinear with each other in the cross-sectional view. The coplanar/collinear arrangement in cross-sectional view denotes a coannular surface profile of the sealing surfaces 526*a,b* in the current embodiment, although the surfaces may be of different diameters in various embodiments. The sealing surfaces 526*a,b* are intended to contact pipe elements placed inside of the gasket 150 to provide a fluid seal for the pipe elements. The sealing surfaces 526*a,b* face radially inwardly and extend substantially axially at rest. In other words, by "face radially inwardly," when the sealing surfaces 526*a,b* are not in contact with pipe elements, the sealing surfaces 526*a,b* approximate a cylinder that is about coaxial with the pipe elements intended to be used with the coupling 100. Thus, the sealing surfaces 526*a,b* appear as lines that are parallel with the axis of pipe elements 710 in cross-sectional view, as seen in FIGS. 8A-8E. Any angle with respect to the pipe elements 710 is minimal.

The orientation of the sealing surfaces 526*a,b* is intended to ease the insertion of pipe elements into contact with the sealing surfaces 526*a,b* of gasket 150. Extending from each sealing surface 526*a,b* is the axially inner drafted edge 527*a,b*. The axially inner drafted edges 527*a,b* may be rounded, slanted, or various shapes in cross-section in various embodiments. Such cross-sectional shapes translate to paraboloid and conical shapes in various embodiments. Such shapes are truncated, as a full cone or paraboloid would not allow insertion of pipe elements in the gasket 150. The axially inner drafted edges 527*a,b* define the termination of the sealing ridge 525*a,b* along the axially inward direction.

A center rib 530 extends radially inward from the annular body 510. The center rib 530 includes a central groove 531 and two sealing members 557*a,b* which each include a sealing surface 532*a,b*. Each sealing member 557*a,b* in the current embodiment is a rounded protrusion from the central groove 531. In various embodiments, various shapes and configurations of sealing members 557*a,b* may be used, including flattened shapes, combinations of protrusions, and unconnected surfaces, among others. The sealing surface 532*a,b* is included on the sealing member 557*a,b*, respectively. The central groove 531 is positioned between the sealing surfaces 532*a,b* such that the sealing surfaces 532*a,b* of the sealing members 557*a,b* are capable of contacting the pipe elements and providing additional sealing interaction therewith.

Each sealing rib 520*a,b* has an innermost radial extent as measured from the annular body 510. In addition, each sealing rib 520*a,b* has an edge radial extent as measured from the annular body 510 to an axially innermost end of each of the axially inner drafted edges 527*a,b*. The center rib 530 has an innermost radial extent as measured from the annular body 510. The innermost radial extent of the center rib 530 is closer to the annular body 510 than the innermost radial extent of each of the pair of sealing ribs 520*a,b*. Additionally, in the current embodiment, the innermost radial extent of the center rib 530 is closer to the annular body 510 than the edge radial extent of each of the pair of sealing ribs 520*a,b*. The innermost radial extent of the center rib 530 may be as far from the annular body as, or farther from the annular body 510 than, the edge radial extent of each of the pair of sealing ribs 520*a,b* in various embodiments. The innermost radial extent of the center rib 530 may also be equally as far from the annular body 510 as the innermost radial extent of each of the pair of sealing ribs 520*a,b* in various embodiments.

The gasket 150 may be made of rubber, plastic, cork, wood, metal, ceramic, polymer, elastomer, rosin, foam, any combination of the foregoing materials, or any material suitable for sealing two pipe elements joined in end-to-end relationship. "Pipe elements" may mean pipes, valves, meters, or any other piping joint suitable to be sealed.

The annular body 510, the sealing ribs 520*a,b*, and the center rib 530 define gasket channels 540*a,b* as seen in FIG. 5. The gasket channels 540*a,b* are pockets into which fluid media may flow when the gasket 150 is in use. The gasket channels 540*a,b* are tubular channels in the current embodiment but may be various shapes in various embodiments. When placed in sealing contact with an exterior surface of a pipe element, the gasket channels 540*a,b* allow some fluid pressure to aid in sealing the sealing ridges 525*a,b* against pipe elements, although such use is not necessary for successful sealing of the gasket 150. The center rib 530 decreases in thickness from its radial outermost to its termination radially inward.

In addition, when the gasket 150 is in use, the sealing members 557*a,b* and the groove 531 act to prevent substantial fluid media flow into the gasket channels 540*a,b*. When placed in sealing contact with exterior surfaces of pipe elements, the sealing surfaces 532*a,b* of the sealing members 557*a,b* prevent substantial fluid media flow into gasket channels 540*a,b*, retaining fluid media flow in the groove 531. The gasket, in alternative embodiments, may include a plurality of center ribs, each with at least one sealing member and at least one sealing surface, which perform the same function as described above to prevent substantial media flow into the gasket channels.

One problem that the center rib 530 can alleviate is the buildup of fluids in the gasket channels 540*a,b*. For example, in applications where fluid media is water in cold temperature environments, preventing water buildup in the gasket channels 540*a,b* can lead to damage to the gasket 150 if the water freezes and, thereby, expands.

Figure 6:
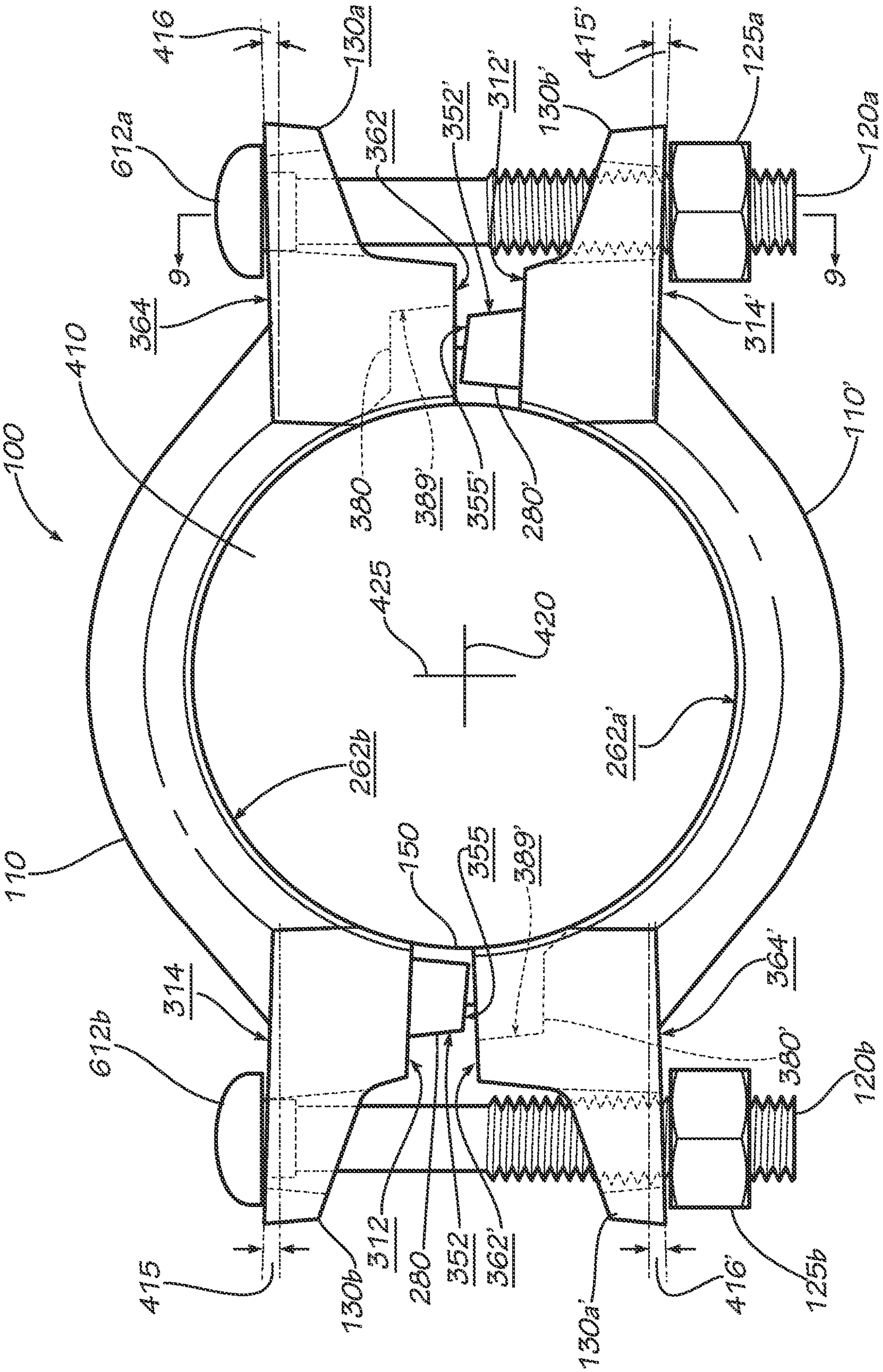
FIG. 6 is a side view of the coupling of FIG. 1 in an assembled and untightened position.

FIG. 6 shows the coupling 100 in an assembled but untightened position. It can be seen in this view that each top surface 314,314' is parallel to each bottom surface 312,312', respectively. Likewise, each top surface 364,364' is parallel to each bottom surface 362,362', respectively. However, the fastener pads 130*a,b,a*',b' are not aligned. In other words, the surfaces of adjacent fastener pads 130*a,b,a*',b' are not parallel. As can be seen, top surface 314 is not parallel to top surface 364 because angles 415 and 416 do not align. This angular misalignment allows each segment 110,110' to deflect under tightening pressure of the bolts 120*a,b* and nuts 125*a,b* to provide so that the top surfaces 314,314' and 364,364' are substantially parallel when the segments 110, 110' are deformed. In various embodiments, the top surfaces 314,314' and 364,364' may be parallel before deforming the segments 110,110'. In such embodiments, the top surfaces 314,314' and 364,364' may be non-parallel after deflection.

As can be seen in FIG. 6, the groove shoulder surface 389 of segment 110' is angled so that it aligns with an outer surface 352' of tongue 280' of segment 110' upon deformation of the segments 110,110' as will be shown below in FIG. 7. Upon deformation of the segments 110,110' (as described below), the grooved shoulder surface 389 of segment 110 becomes parallel and flush with outer surface 352' of tongue 280' of segment 110', and grooved shoulder surface 389' of groove 380' of segment 110' becomes parallel and flush with outer surface 352 of segment 110.

As can be seen in FIG. 6, the annular nature of the gasket 150 defines a coupling void 410 within the gasket 150 that is adapted for certain diameters of pipe elements. In practice, when pipe elements are introduced within the gasket 150, they are placed inside the coupling void 410. Also seen in FIG. 6, a central axis of each of the bolts 120*a,b* is parallel to the vertical axis 425 such that heads 612*a,b* of the bolts 120*a,b* sit at an angle with the top surfaces 314, 364. In alternative embodiments, the bolts 120*a,b* may be angled with respect to the vertical axis 425 such that heads of the bolts 120*a,b* sit flush against the top surfaces 314,364. In the current embodiment, the gasket 150 sits within the segments 110,110'. Each of the sealing surfaces 526*a,b* of the gasket 150 has the same cylindrical profile and the same radius as the contact surfaces 262*a,b,a*',b'. In alternative embodiments, the sealing surfaces 526*a,b* of the gasket 150 may have a smaller or a larger radius than the contact surfaces 262*a,b,a*',b'. In many embodiments, sealing surfaces 526*a,b* are in contact with the outer surfaces of the pipe elements before the tightening elements (bolts 120*a,b* and nuts 125*a,b*) are engaged. In those embodiments, further compression of the gasket 150 will not necessarily produce a more effective seal. However, in other embodiments, it may be necessary for the segments 110,110' to compress the gasket 150 to effectuate a useful seal against the outer surface of the pipe elements. In many embodiments, sealing surfaces 532*a,b* are positioned in contact with or slightly above contact with the pipe elements. In those embodiments, deformation of the gasket 150 is necessary to seal the sealing surfaces 532*a,b* against the pipe elements. In some embodiments, however, sealing surfaces 532*a,b* are in sufficient engagement with the pipe elements prior to engagement of the tightening elements (bolts 120*a,b* and nuts 125*a,b*) so that further tightening does not necessarily effectuate a better seal.

Upon compression of the gasket 150 by the segments 110,110', the gasket 150 will most naturally deform from about circular in shape to an oblong shape. In most applications, compression by the segments 110,110' on the gasket 150 will compress the gasket along the vertical axis 425, but the gasket 150 will tend to extend along the horizontal axis 420. This occurs particularly because the segments 110,110' first contact the pipe elements—and, thus, first compress the gasket 150—at a point central to the segments 110,110'. As shown in FIGS. 4 and 6, the tongues 280,280' of the segments 110,110' extend beyond the horizontal axis 420, thereby preventing the annular deformation of the gasket 150. Deformation of the gasket 150 is properly directed to the deformation groove 517 by the tongue 280 and groove 380 configuration of the coupling 100. The restraint against oblong deformation provided by the tongues 280,280' promotes more uniform compression of the gasket 150 against the pipe elements, thereby providing a more reliable seal.

Tightening of the tightening elements (bolts 120*a,b* and nuts 125*a,b*) seats the gasket 150 against the pipe elements. When the segments 110,110' are properly deformed and the gasket 150 is properly seated, the coupling 100 restrains the pipe elements from pullout because the contacting portion 292*a,b.a',b'* (not shown in FIG. 6) of each segment 110,110' is seated inside at least one groove of at least one pipe element. The gasket 150 is compressed in sealed engagement with the pipe elements. In some embodiments, the sealing members 557*a,b* may be replaced by a single sealing member that extends between the two pipes. Such deformation allows heads 612*a,b* of the bolts 120*a,b* to seat flush against the top surfaces 314,364 of segment 110 while nuts 125*a,b* seat flush against the top surfaces 314',364' of segment 110'.

When properly seated, media (such as water, gas, or other fluid) may be allowed to flow through the pipe elements. The gasket 150 seals such media in at least one of two ways. If the gasket 150 is compressed so that sealing surfaces 532*a,b* of the sealing members 557*a,b* are properly seated against the outside of the pipe elements, such sealing interaction may be sufficient to contain the media inside the pipe elements without breaching the joint. In some applications, such sealing engagement may be impossible to attain, or the pressure of media within the pipe elements may be too great for such a sealing engagement to effectuate a proper seal. In such applications, media may travel past the sealing members 557*a,b* and into the gasket channels 540*a,b*.

If media passes into the gasket channels 540*a,b*, there are two safeholds against leakage. First, in many applications, sealing surfaces 526*a,b* are in sealing engagement with the pipe elements prior to compression of the gasket 150 by the segments 110,110', and further compression of the gasket 150 enhances such sealing engagement. In other applications, sealing engagement of the gasket 150 with the pipe elements is achieved by compression of the gasket 150 by the segments 110,110'. Second, if media passes into the gasket channels 540*a,b*, it is assumed that such media is of a higher pressure than atmospheric. As such, the higher pressure in the gasket channels 540*a,b* further forces the sealing ridges 525*a,b* against the pipe elements. The higher pressure results in an even more effective seal by using the pressure of the media inside the pipe elements to effectuate a more complete seal. If liquid media is found in the pipe, such liquid may provide additional air-tight seal to further aid the engagement of the gasket 150 with the pipe elements. In some embodiments, gas-proofing grease may be applied to the contact surfaces 526*a,b* and 532*a,b* to aid in sealing. In many embodiments, grease is unnecessary.

In the current embodiment, the coupling 100 is assembled in the untightened position of FIG. 6 before use. In other embodiments, the coupling 100 may be assembled in various pieces as part of the method of use.

Figure 7:
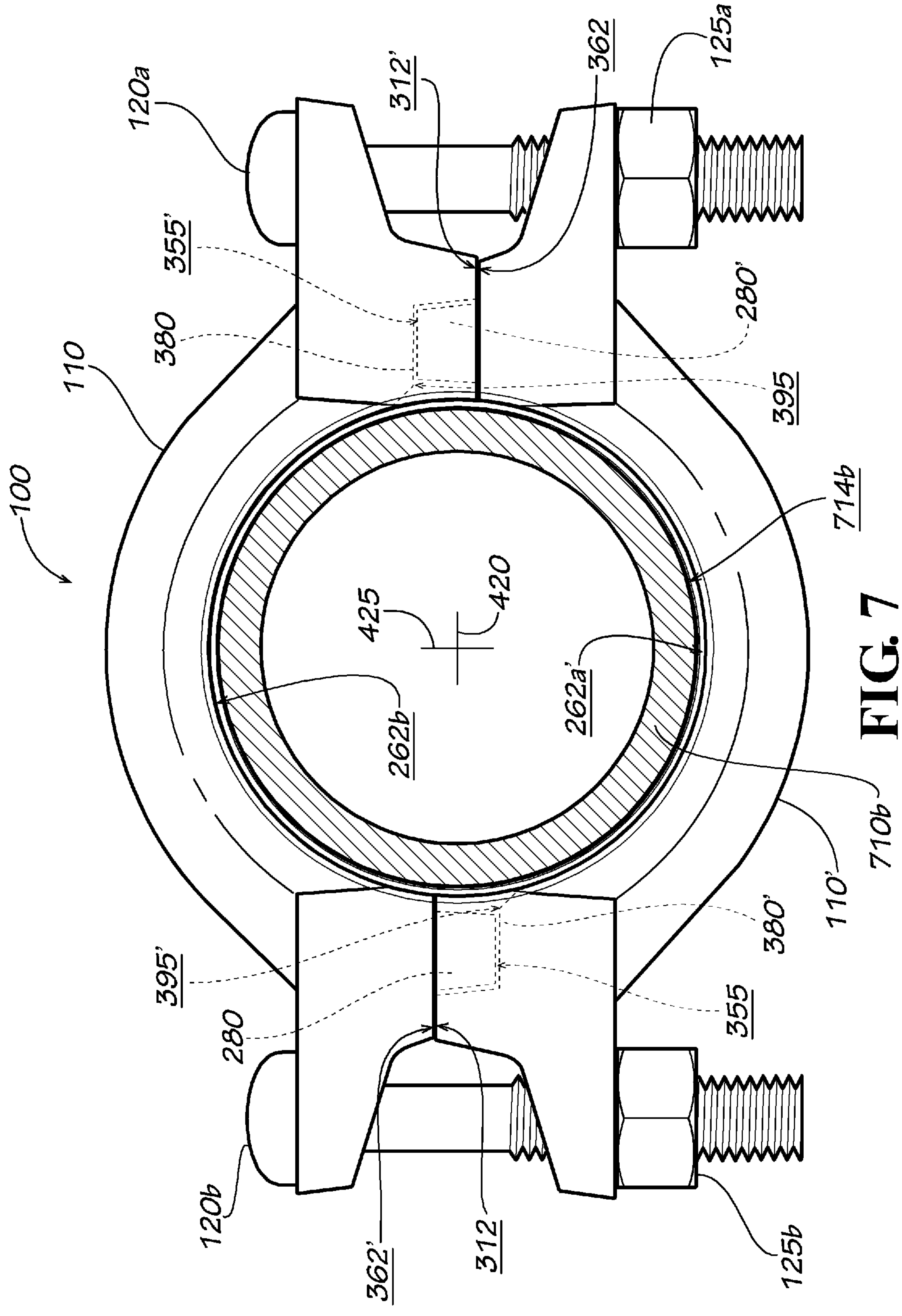
FIG. 7 is a side view of the coupling of FIG. 1 in an assembled and tightened position, including a cross-sectional view of pipe elements.

The coupling 100 in FIG. 7 is shown tightened and deformed around a pair of pipe elements 710*b,a* (710*a* not shown in FIG. 7). The segments 110,110' in the current view are fully deformed in the current embodiment, and contact surfaces 262*b,a*' touch a groove surface 714*b,a* (714*a* not shown in FIG. 7), which is the outer surface of the pipe element 710 within the groove 720*b,a* (not shown in FIG. 7). Contact surface 262*a* of segment 110 and contact surface 262*b*' of segment 110' are not shown in FIG. 7 because they are obstructed by the view. As described above, in some embodiments, the shoulder surfaces 296*a,b,a*',b' may contact an outermost surface of each pipe element 710*a,b* outside of the groove 720*b,a* (not shown in FIG. 7), and the contact surfaces 262*a,b,a*',b' may never contact the groove surface 714*a,b* of each pipe element 710*a,b* within each groove 720*a,b*. In other embodiments, the contact surfaces 262*a,b, a*',b' contact the groove surfaces 714*a,b*.

When the segments 110,110' travel toward each other and deform under the tightening of the tightening elements (nuts 120*a,b* and bolts 125*a,b*), the gasket 150 is deformed in accord therewith. In some embodiments, a rigid or semi-rigid gasket 150 may be included. The process for accommodating such a material may be altered from that described herein. The gasket 150 includes the deformation groove 517 to allow a place for material to go upon deformation of the gasket 150.

Figure 8B:
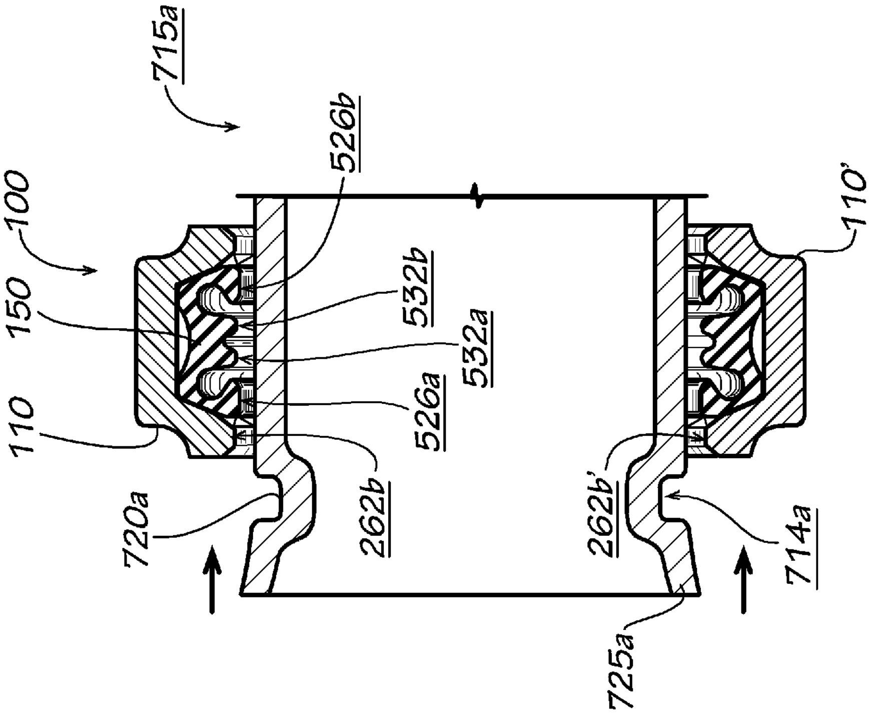
FIG. 8B is a cross-sectional view of the coupling of FIG. 1 during installation on pipe elements.
Figure 8A:
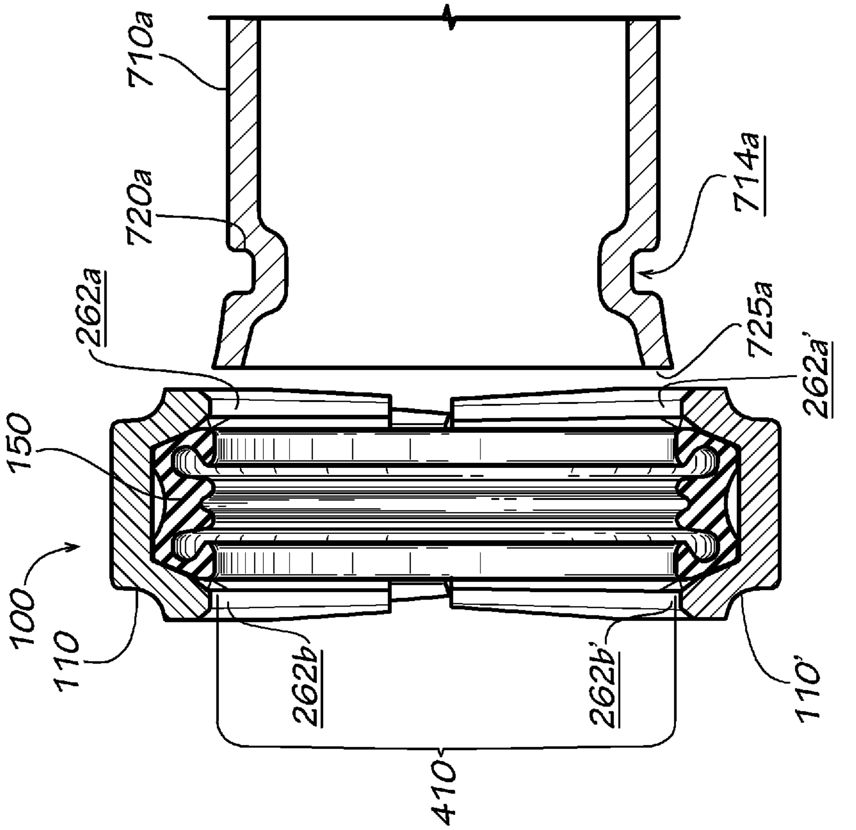
FIG. 8A is a cross-sectional view of the coupling of FIG. 1 before installation on pipe elements.
Figure 8D:
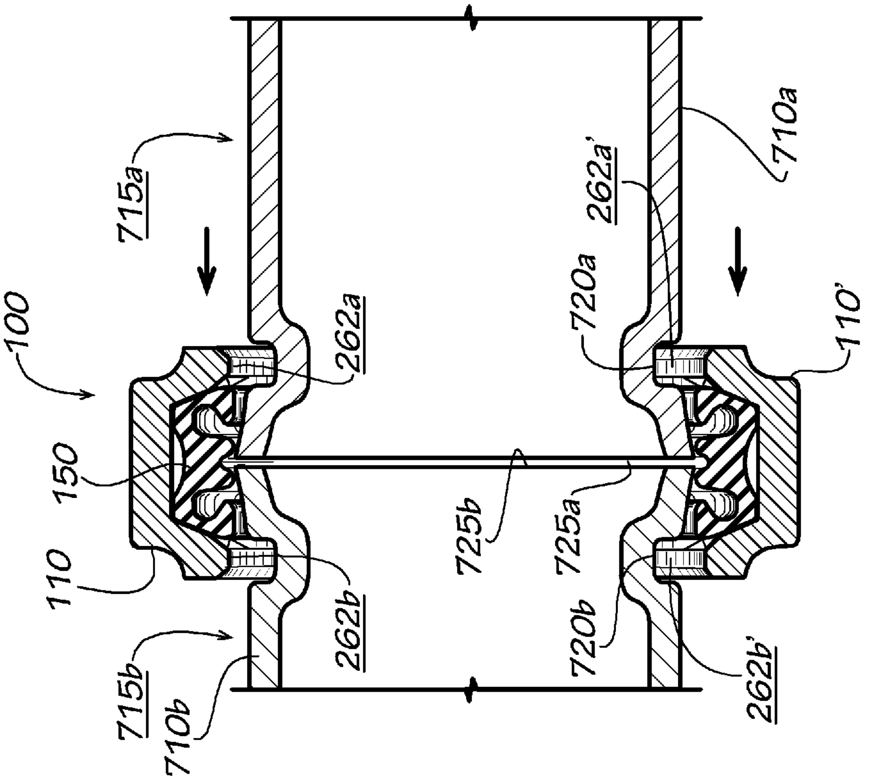
FIG. 8D is a cross-sectional view of the coupling of FIG. 1 during installation on pipe elements.
Figure 8C:
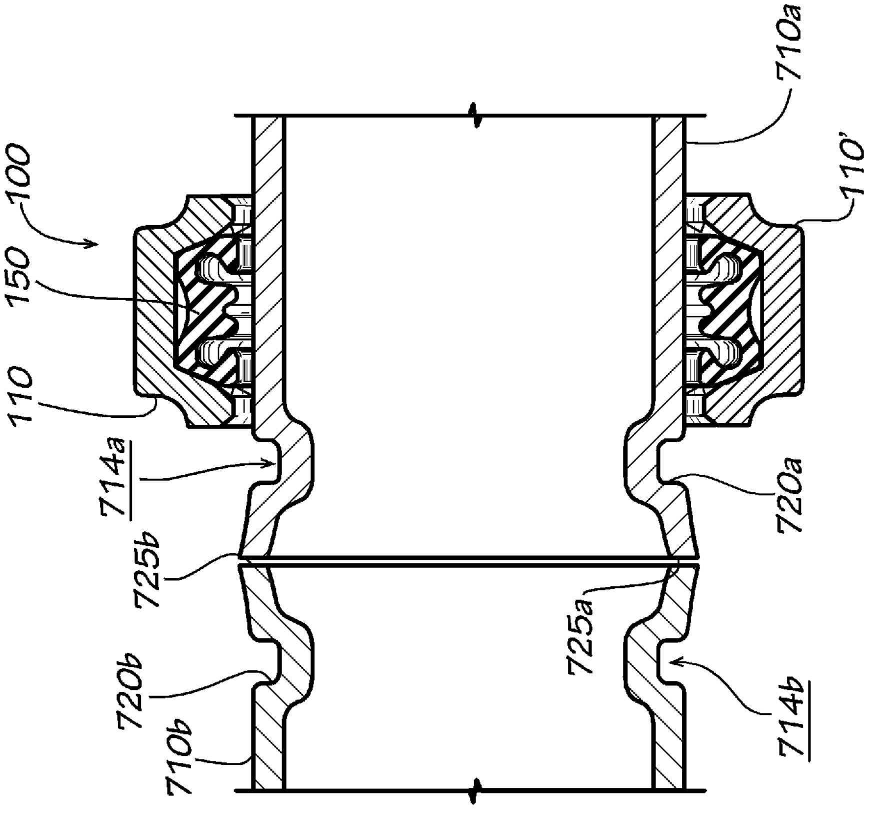
FIG. 8C is a cross-sectional view of the coupling of FIG. 1 during installation on pipe elements.

Installation of the coupling 100 on the pair of pipe elements 710*a,b* is illustrated in FIGS. 8A-8E. For the current embodiment, the coupling 100 is introduced to a pair of pipe elements 710*a,b* in the preassembled but untightened position of FIG. 6. Each pipe element 710*a,b* may include at least one groove 720*a,b* for alignment with contact surfaces 262*a,b,a*',b'. In the currently described method, the coupling 100 is aligned with an end 725*a* of the first pipe element 710*a* as shown in FIG. 8A. The coupling 100 is installed by placing the end 725*a* of the first pipe element 710*a* in the coupling void 410 and forcing the coupling 100 onto the first pipe element 710*a* as shown in FIG. 8B. As seen in FIG. 8B, sealing surfaces 526*a,b* and sealing surfaces 532*a,b* are a small distance away from an outer surface 715*a* of the first pipe element 710*a*, although the sealing surfaces 526*a,b* and 532*a,b* may contact the outer surface 715*a* in some embodiments. In the currently-described method, the entire coupling 100 is forced beyond the groove 720*a* of the first pipe element 710*a* so that the contact surfaces 262*b,b*' have passed the groove 720*a*. In some embodiments, it may not be necessary to force the entire coupling 100 beyond the groove 720*a*. As seen in FIG. 8C, the second pipe element 710*b* having an end 725*b* is introduced in end-facing relationship to the end 725*a* of the first pipe element 710*a*. In the current embodiment, the pipe elements 710*a,b* are approximately the same diameter, although non-uniform diameter pipe elements may be joined in various embodiments. In the current embodiment, each pipe element 710*a,b* has ends 725*a,b* that are flared slightly. Grooves 720*a,b* can be formed in one of two ways: rolled or machined. If the grooves 720*a,b* are machined, the pipe elements 710*a,b* are unlikely to have flares on the ends 725*a,b* as shown. However, if the grooves 720*a,b* are rolled, the pipe elements 710*a,b* are more likely to have flares on the ends 725*a,b*. As such, the coupling 100 of the current embodiment is designed to accommodate the potential flaring of ends 725*a,b*. The coupling 100 is sized to fit over the largest possible flare of the ends 725*a,b* in the current embodiment based on standard tolerancing for creating the grooves 720*a,b*.

Figure 8E:
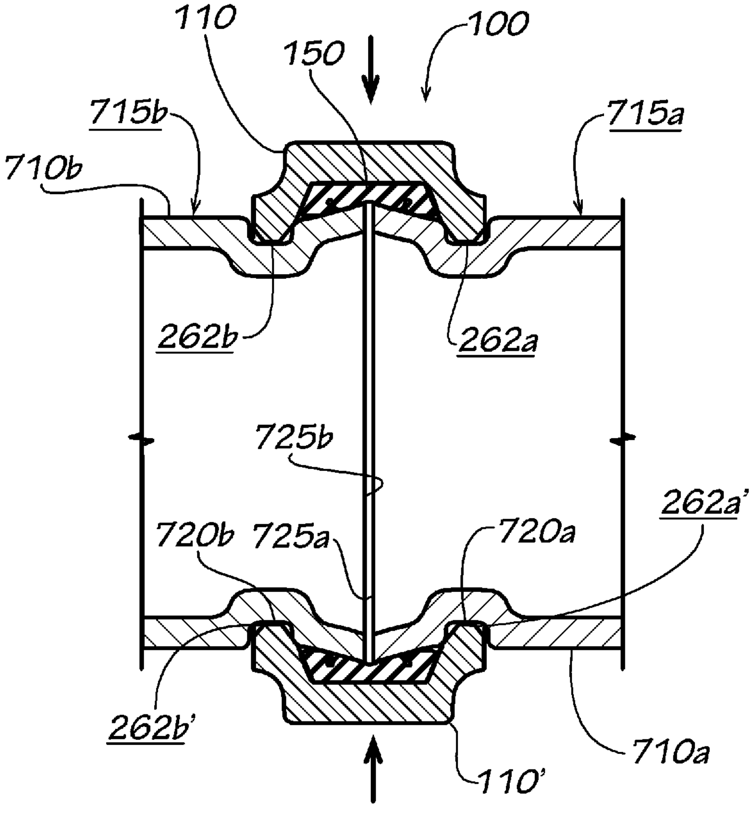
FIG. 8E is a cross-sectional view of the coupling of FIG. 1 after installation on pipe elements.

When the second pipe element 710*b* is about aligned with the first pipe element 710*a*, the coupling 100 is moved so that the gasket 150 is aligned on outer surfaces 715*a,b* over the ends 725*a,b* of the pipe elements 710*a,b* and with the contact surfaces 262*a,b,a*',b' aligned with the grooves 720*a, b*, as shown in FIG. 8D. As seen in FIG. 8E, when the segments 110,110' are clamped down, the gasket 150 deforms into sealing engagement the outer surfaces 715*a,b* of the pipe elements 710*a,b* and the contact surfaces 262*a, b,a*',b' sit within the grooves 720*a,b* and touch groove surfaces 714*a,b*. In various embodiments, the contact surfaces 262*a,b,a*'b' may not touch groove surfaces 714*a,b* upon clamping down the segments 110,100'.

Several features of the gasket 150 ease installation as described. Friction can cause installation of rubber gaskets to bind against outer surfaces 715*a,b* of pipe elements 710*a,b*. With reference to FIG. 3, FIG. 5, FIG. 6, and the method previously described with FIGS. 8A-8E, axially outer drafted edges 522*a,b* and axially inner drafted edges 527*a,b* are both drafted to ease the pipe elements 710 into the coupling void 410. Axially outer drafted edges 522*a,b* and axially inner drafted edges 527*a,b* also help to prevent rollover of the sealing ridges 525*a,b* of the gasket 150 during sliding on and off, as the drafted profiles are less likely to bind against the outer surfaces 715*a,b* of the pipe elements 710*a,b*. Additionally, contact portions 555*a,b* are substantially parallel to the outer surface 715*a,b* of the pipe elements 710*a,b* even when the gasket 150 is not seated on a pipe elements 710*a,b*. Additionally, the configuration of the center rib 530 with respect to the sealing ribs 527*a,b*, as discussed above with reference to FIG. 5, prevents the center rib 530 from obstructing the installation of the coupling 100 by providing limiting contact between the center rib 530 and the outer surface 715*a,b* of pipe elements 710*a,b* before deformation of the gasket 150. When the segments 110,110' are clamped down, the gasket 150 deforms, and the center rib 530 contacts the outer surface 715*a,b* of pipe elements 710*a,b*. This configuration allows the gasket 150 to slide onto the pipe elements 710*a,b* without biasing the sliding in one direction and prevents binding of the sealing ridges 525*a,b* during installation. These features prevent the gasket 150 from rolling over when the coupling 100 is installed on the pipe elements 710*a,b* and allows the gasket 150 to be properly placed over the joint between the pipe elements 710*a,b* for proper sealing, among other advantages. When the gasket 150 is properly aligned over the joint, each of the sealing members 557*a,b* may contact the outer surface 715*a,b* of one pipe element 710*a,b* or may be aligned above the surface 710*a,b* of the pipe elements 715*a,b*. However, the alignment of the sealing members 557*a,b* is not critical to effectuate a seal of the joint.

When the coupling 100 is aligned on the joint of the pipe elements 710*a,b*, the tightening elements are used to draw the segments 110,110' together. In the current embodiment, this takes the form of nuts 125*a,b* tightening down on bolts 120*a,b* to compress the fastener pads 130*a,b,a*',b' toward each other. In some embodiments, the coupling 100 is rigid and includes no deflection of the segments 110,110'. In the current embodiment, the engagement of the tightening elements (bolts 120*a,b* and nuts 125*a,b*) first cause the segments 110,110' to travel toward each other. When the segments 110,110' contact the pipe elements 710*a,b*, the segments 110,110' deform (deflection) until each segment 110,110' is in the desired engagement with the pipe elements 710*a,b*. The deformation of the segments 110,110' can be seen by comparing FIGS. 6 and 7. The contact surfaces 262*a,b,a*',b' contact groove surfaces 714*a,b* of the grooves 720*a,b* in the pipe elements, at which time the segments 110,110' begin deflection. In some embodiments, shoulder surfaces 296*a,b,a*',b' (refer to FIG. 4 for the location of shoulder surfaces 296*a,b,a*',b') contact the outer surface of the pipe elements such that the contact surfaces 262*a,b,a*',b' never contact the groove surfaces 714*a,b*.

As can be seen in FIG. 7, the segments 110,110' may deflect so that bottom surfaces 362,362' are in contact with bottom surfaces 312',312, respectively, in some embodiments. This configuration need not be present in all embodiments. In some embodiments, the mating surfaces 355,355' will contact mating surfaces 395',395, respectively, before the bottom surfaces 362,362' contact bottom surfaces 312', 312, respectively. In some embodiments, bottom surfaces 362,362' will contact bottom surfaces 312',312 before mating surfaces 355,355' contact mating surfaces 395',395, respectively. Because of the deflection and deformation of the segments 110,110', the angles 415,416,417,418, as pointed out in FIG. 4 (angles 415',416',417',418' not shown), are reduced as the top surfaces 314,314' and 364,364' and the bottom surfaces 312,312' and 362,362' approach a position parallel with the horizontal axis 420. As shown, mating surfaces 355,355' are in contact with mating surfaces 395', 395, respectively, as well.

Figure 9:
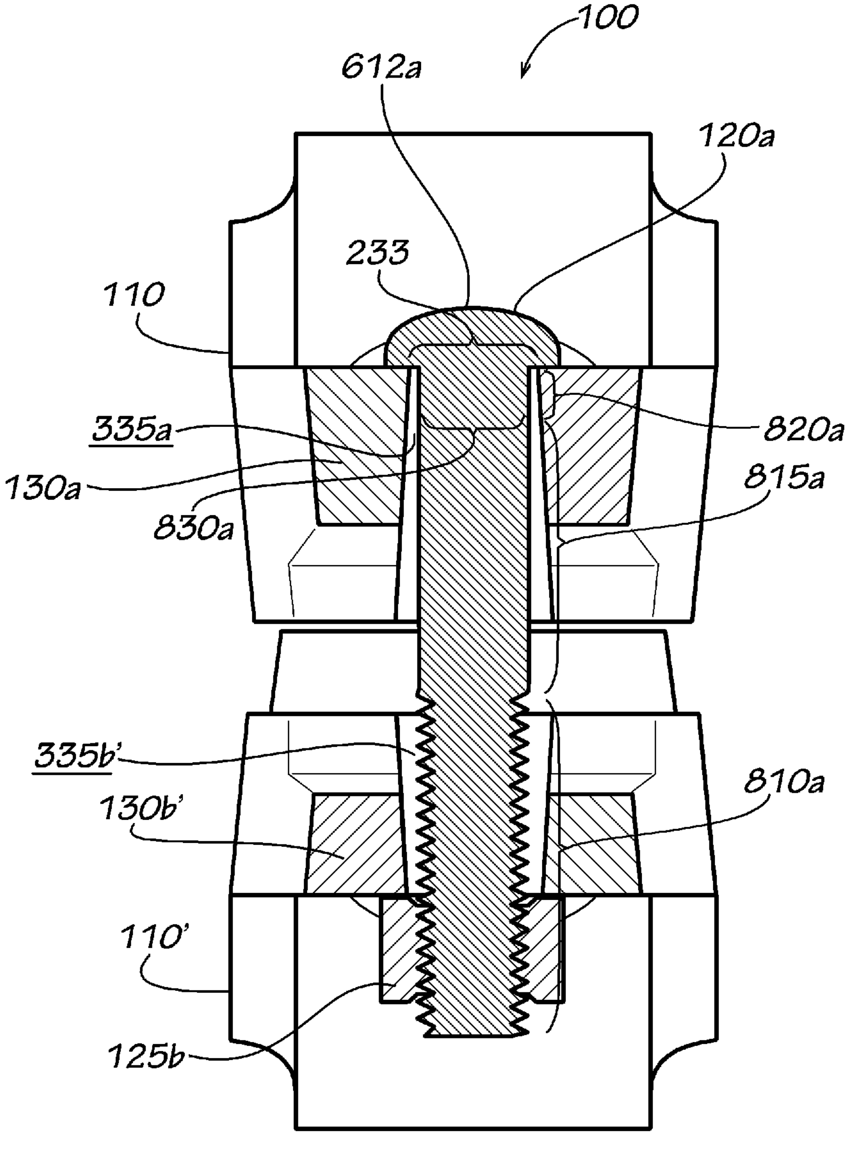
FIG. 9 is a cross-sectional view of the coupling taken in a plane indicated by line 9 in FIG. 6.

Seen in the cross-sectional view of FIG. 9, each bolt 120*a,b* (b not shown in FIG. 9) includes a head 612*a,b* (b not shown in FIG. 9), a threaded portion 810*a,b* (b not shown in FIG. 9), a shank portion 815*a,b* (b not shown in FIG. 9), and a collar portion 820*a,b* (b not shown in FIG. 9). Combined together, each threaded portion 810*a,b*, shank portion 815*a, b*, and collar portion 820*a,b* is termed the shaft portion. Each shaft portion may omit any combination of the threaded portion 810, shank portion 815, and collar portion 820 in various embodiments. The nuts 125*a,b* (b not shown in FIG. 9) engage the bolts 120*a,b* (b not shown in FIG. 9) along part of the threaded portion 810*a,b*. Tightening of the nuts 125*a,b* compresses the fastener pads 130*a,b,a*',b' and deforms the segments 110,110' to conform to the shape of the pipe elements, as previously described.

As previously described, when the coupling 100 is installed onto pipe elements, the assembled and untightened coupling 100 is installed over the edge of the first pipe element 710*a* until it passes completely over any groove 720*a* in the first pipe element 710*a* after which the second pipe element 710*b* is placed end-facing to the first pipe element 710*a*. The coupling 100 is then slid into position straddling the first and second pipe elements 710*a,b*. Although (as previously described) it is common for gaskets to bind during such installation, it is also possible for friction to cause rocking of the segments 110,110' not only against any gasket but also against the exterior of the pipe elements 710*a,b*. If a leading edge of one segment 110,110' catches against the exterior of the pipe element 710*a,b*, the segments 110,110' have a tendency to rock with respect to each other. Rocking of segments 110,110' can cause additional binding of the gasket 150, making installation of the coupling 100 difficult and potentially damaging to components of the coupling 100, including the gasket 150.

The shape of the fastener hole 132*a* (see FIG. 2) includes an axial length 233 (axial length 237 of fastener hole 132*b* not shown) that tends to prevent such rocking of the segments 110. For the fasteners of the current embodiment, each of the heads 612*a,b*, threaded portions 810*a,b*, and shank portions 815*a,b* are symmetrical about the center of the bolt 120*a,b*, respectively. The shank portions 815*a,b* are cylindrical, the threaded portions 810*a,b* are cylindrical except that each has threading along its outermost edge, and the heads 612*a,b* are cross-sectionally circular at cross-sections taken orthogonal to the center axis. However, the collar portions 820*a,b* are not cylindrical but instead include a profile approximating that of the fastener holes 132*a,b* as measured at the top surfaces 364,314. Each collar portion 820*a,b* includes an axial length 830*a,b* that is about the same as the diameter of the shank portions 815*a,b*. The collar portions 820*a,b* also include a transverse length (not shown) that is proportionally larger than the axial length 830*a,b*. The axial length 830*a,b* of each collar portion 820*a,b* may be smaller than the axial length 233,237 of each fastener hole 132*a,b*, the transverse length of each collar portion 820*a,b* may be smaller than the transverse length 243,247 of each fastener hole 132*a,b*, and the axial length 233,237 of each fastener hole 132*a,b* is smaller than the transverse length 830*a,b* of each collar portion 820*a,b*.

The arrangement of each collar portion 820*a,b* engages the fastener hole 132*a,b* in assembly and retains the bolt 120 in a fixed arrangement with respect to the segment 110 in each fastener hole 132*a,b*. This allows a user to tighten the nuts 125*a,b* without need to restrain the bolts 120*a,b*, as the collar portions 820*a,b* retain the bolts 120*a,b* through interaction with the fastener holes 132*a,b*. This result occurs because the axial length 233,237 of each fastener hole

132*a,b* is smaller than the transverse length 830*a,b* of each collar portion 820*a,b*. Such an arrangement would result even if the orientation of the fastener holes 132*a,b* were at a different angle.

However, the arrangement as displayed also prevents the rocking of the segments 110,110' by keeping the shank portions 815*a,b*, the collar portions 820*a,b*, and the threaded portions 810*a,b* in close proximity to the inner surfaces 335*a,b,a*',b' of the fastener holes 132*a,b,a*',b'. Should one of the segments 110,110' begin a rocking motion, at least one of the inner surfaces 335*a,b,a*',b' will contact at least one of the bolts 120*a,b* along at least one of the collar portions 820*a,b*, the shank portions 815*a,b*, and the threaded portions 810*a,b* thereby providing a mechanical stop to prevent further rotation of the segments 110,110' with respect to the bolts 120*a,b* and, thereby, with respect to the other segment 110',110.

Although all sides of the fastener holes 132*a,b,a*',b' are shown as drafted in the current embodiment, some sides may be drafted or may be parallel in various embodiments. For example, in the current embodiment, fastener holes 132*a,b, a*',b' are drafted because the segments 110,110' are cast. However, if fastener holes 132*a,b,a*',b' were machined, it would not be necessary to draft the fastener holes 132*a,b, a*',b'.

Figure 10:
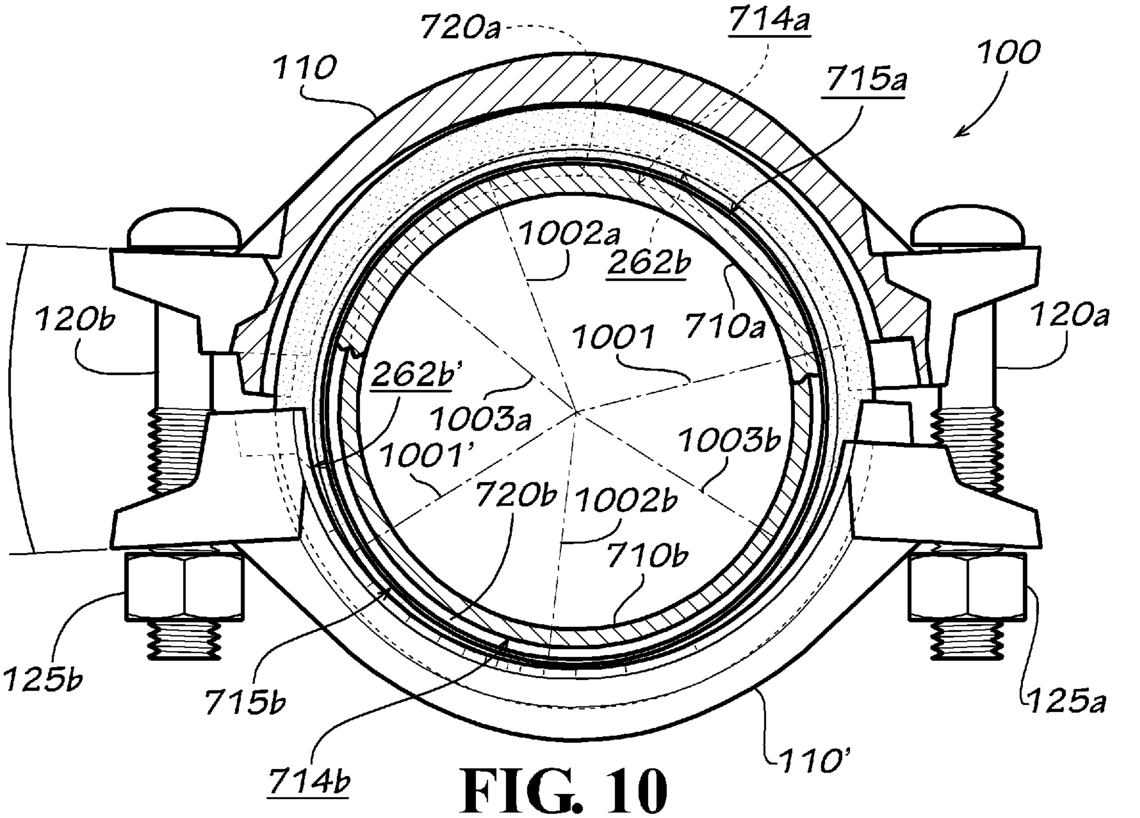
FIG. 10 is a partial cross-sectional view of the coupling of FIG. 1 assembled around pipe elements and in an untightened position.

As seen in FIG. 10, each pair of contact surfaces 262*a,b* and 262*a*',b' (262*b* and 262*b*' shown in FIGS. 10 and 11) defines a predeformation radius 1001,1001'. Likewise, each pipe element 710*a,b* defines a radius 1002*a,b*. In the current embodiment, when the coupling 100 is in the untightened position, the predeformation radii 1001,1001' of each pair of contact surfaces 262*a,b* and 262*a*',b', respectively, is greater than the radii 1002*a,b* of the pipe elements 710*a,b*. Groove radii 1003*a,b* are also shown on the pipe elements 710*a,b*, respectively. Because the predeformation radii 1001,1001' are larger than the radii 1002*a,b*, the coupling 100 can be more easily maneuvered over each pipe element 710*a,b* as described more thoroughly with reference to FIGS. 8A-8E. Having larger predeformation radii 1001,1001' than radii 1002*a,b* allows the coupling 100 to be slid onto the pipe elements 710*a,b* as a preassembled unit. As described above, once the coupling 100 is aligned over the pipe elements 710*a,b*, no further assembly of the coupling 100 is required. Instead, the user need only tighten the nuts 125*a,b* on the bolts 120*a,b* to secure the coupling 100 in sealing engagement with the pipe elements 710*a,b*.

Figure 11:
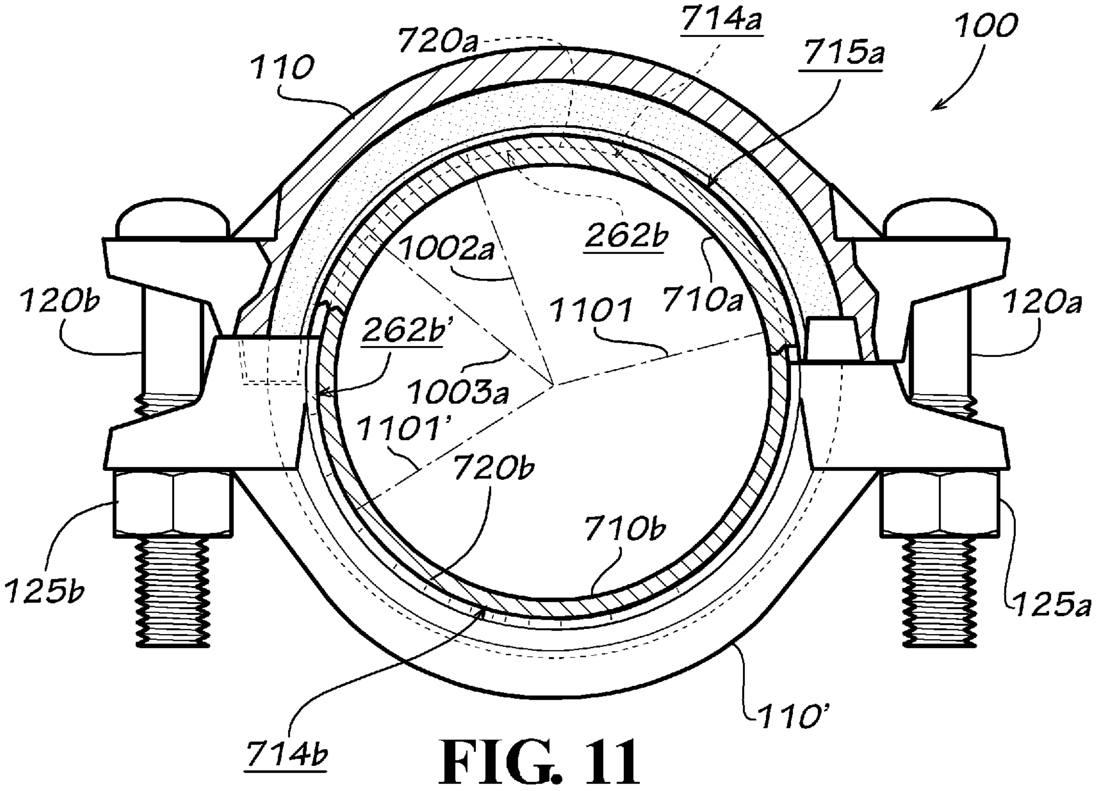
FIG. 11 is a partial cross-sectional view of the coupling of FIG. 1 assembled around pipe elements and in a tightened position.

As seen in FIG. 11, once the nuts 125*a,b* are tightened onto the bolts 120*a,b*, each segment 110,110' of the coupling 100 deforms in conformity with the grooves 720*a,b*. Once deformed, a postdeformation radius 1101,1101' is defined by each pair of contact surfaces 262*a,b* and 262*a*',b' (262*b* and 262*b*' shown in FIGS. 10 and 11), respectively. In the current embodiment, each postdeformation radius 1101,1101' is equal to the groove radii 1003*a,b* because the contact surfaces 262*a,b,a*',b' contact the groove surfaces 714*a,b*. In embodiments where the contact surfaces 262*a,b,a*',b' do not contact the groove surfaces 714*a,b*, the postdeformation radii 1101,1101' may be larger than the groove radii 1003*a,b*. Although not required in all embodiments, the postdeformation radii 1101,1101' will likely be smaller than the radii 1002*a,b* even if the postdeformation radii 1101,1101' is larger than the groove radii 1003*a,b*.

This assembly configuration represents one of many possible assembly configurations. One skilled in the art will understand obvious variations of this assembly configuration are included within this disclosure, including variations of steps, combinations of steps, and dissections of steps, among others. Where materials are chosen for the elements of this assembly—particularly, rubber, metal, and cast iron—similar material choices may also be used and would be obvious to one in the art. As previously disclosed, the gasket 150 may be made of rubber, plastic, cork, wood, metal, ceramic, polymer, elastomer, rosin, foam, any combination of the foregoing materials, or any material suitable for sealing two pipe elements joined in end-to-end relationship. The segments 110,110' may be made of cast iron, steel, aluminum, titanium, copper, brass, various plastics, polymers, resins, or any material of sufficient strength to withstand the tightening load of the fasteners.

It should be emphasized that the embodiments described herein are merely possible examples of implementations, merely set forth for a clear understanding of the principles of the present disclosure. Many variations and modifications may be made to the described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

That which is claimed is:

1. A coupling comprising:
- a segment comprising:
  - a central portion having an inner surface; and
  - an edge portion oriented relative to the central portion and configured to interact with a pipe, the edge portion comprising:
    - a contacting portion configured to contact the pipe;
    - a support portion defining a shoulder oriented relative to the contacting portion; and
    - a node protruding from the edge portion between the support portion and the contacting portion;
  - a segment body interposed between a first fastener pad and a second fastener pad;
  - a tongue comprising a mating surface defining a tip angle of a leading edge of the tongue on the first fastener pad; and
  - a groove defining a bottom surface defining a bottom angle on a second end of the segment body of the second fastener pad opposite the first fastener pad, wherein the tip angle is greater than the bottom angle;

a gasket defining a sealing surface opposite a radial outer surface defining a deformation groove, wherein in a compressed state the inner surface of the segment compresses the deformation groove of the gasket and forms a seal at the sealing surface.

2. The coupling of claim 1, wherein the sealing surface is positioned between the support portion and the contacting portion of the segment in the compressed state.

3. The coupling of claim 1, wherein when the gasket is in an uncompressed state, the deformation groove defines a circular shape.

4. The coupling of claim 1, wherein the sealing surface defines an inner diameter of the gasket and when the coupling is disposed over the pipe defining an outer diameter, the inner diameter of the gasket is greater than the outer diameter of the pipe in an uncompressed state, and in the compressed state the contacting portion of the segment compresses the sealing surface of the gasket against the outer diameter of the pipe.

5. The coupling of claim 1, wherein the gasket comprises a sealing rib defining an axially outer drafted edge extending axially outward and radially outward from the sealing surface at a nonzero angle from a radial direction.

6. The coupling of claim 1, wherein the gasket comprises a sealing rib defining an axially inner drafted edge extending axially inward and radially outward from the sealing surface at a non-zero angle from a radial direction.

7. The coupling of claim 1, further comprising a first protruding from the edge portion between the support portion and the contacting portion.

8. The coupling of claim 7, wherein the first node defines a width that decreases from the support portion to the contacting portion.

9. The coupling of claim 1, wherein the gasket further comprises a center rib extending radially inward from an annular body, and wherein the center rib is axially positioned between a pair of sealing ribs.

10. The coupling of claim 9, wherein the annular body defines a radially outer surface and the radially outer surface defines the deformation groove.

11. The coupling of claim 1, wherein the central portion and the edge portion are located between a first shoulder and a second shoulder of the segment.

12. The coupling of claim 11, wherein the first shoulder and the second shoulder each comprise a radiused portion extending beyond a fastener hole through a draft portion of each shoulder.

13. The coupling of claim 11, wherein the first shoulder and the second shoulder each comprise a taper portion that terminates at an end and melds at an opposite end with a parallel portion of each shoulder.

14. The coupling of claim 1, wherein the first fastener pad comprises a first top surface defining a first top angle and the second fastener pad comprises a second top surface defining a second top angle; and wherein the tip angle is greater than the first top angle and the second top angle.

15. The coupling of claim 1, wherein the first fastener pad comprises a first bottom surface defining a first bottom angle and the second fastener pad comprises a second bottom surface defining a second bottom angle; and wherein the tip angle is greater than the first bottom angle and the second bottom angle.

16. The coupling of claim 1, wherein:

in an uncompressed state:

the first fastener pad comprises a first top surface defining a first top angle;

the second fastener pad comprises a second top surface defining a second top angle; and the tip angle is greater than the first top angle and the second top angle; and in a compressed state:

the tip angle is equal to the first top angle and the second top angle.

17. The coupling of claim 1, wherein:

in an uncompressed state:

the first fastener pad comprises a first bottom surface defining a first bottom angle;

the second fastener pad comprises a second bottom surface defining a second bottom angle; and the tip angle is greater than the first bottom angle and the second bottom angle; and in a compressed state:

the tip angle is equal to the first bottom angle and the second bottom angle.

18. The coupling of claim 1, wherein a first top surface of the first fastener pad is not parallel with a second top surface of the second fastener pad in an uncompressed state and the first top surface is parallel with the second top surface in a compressed state.

19. The coupling of claim 18, wherein the first fastener pad comprises a first bottom surface that is parallel to the first top surface and the second fastener pad comprises a second bottom surface that is parallel to the second top surface.

* * * * *